June 2, 1964   SAN-ICHIRO MIZUSHIMA   3,135,598
RAPID DIRECT REDUCTION METHOD OF IRON OXIDE
Filed April 18, 1961   2 Sheets-Sheet 1

(1) High temperature range.
(2) Low temperature range
(3) Combined temperature range San-Ichiro Mizushima
INVENTOR BY Wenderoth, Lind & Ponack

ATTORNEYS

June 2, 1964  SAN-ICHIRO MIZUSHIMA  3,135,598
RAPID DIRECT REDUCTION METHOD OF IRON OXIDE
Filed April 18, 1961  2 Sheets-Sheet 2

*San-Ichiro Mizushima*
INVENTOR

BY *Wenderoth, Lind & Ponack*

ATTORNEYS

United States Patent Office 3,135,598
Patented June 2, 1964

3,135,598
RAPID DIRECT REDUCTION METHOD
OF IRON OXIDE
San-Ichiro Mizushima, Denenchofu, Tamagawa, Setagaya-ku, Tokyo, Japan, assignor to Yawata Iron & Steel Co., Ltd., Tokyo, Japan, a corporation of Japan
Filed Apr. 18, 1961, Ser. No. 103,898
Claims priority, application Japan Apr. 27, 1960
1 Claim. (Cl. 75—26)

The present invention relates to a rapid and efficient method of direct reduction of iron oxide to metallic iron by the two-step system, which consists of a primary low temperature reaction zone and a secondary high temperature reaction zone in which a reducing gas consisting mainly of hydrogen is used. The main characteristics of this method are that a major part of iron oxide is reduced in the low temperature range between 450 and 600° C., and thereafter the oxide is transferred to the secondary high temperature reaction zone between 700 and 900° C. in which the remaining unreduced oxide is reduced.

In regard to the conventional direct reduction methods of iron oxide by a two-step system, it is known that U.S. Patent No. 2,864,688 entitled, "Two-Step Method of Removing Oxygen From Iron Oxide," by Thomas F. Reed, assignor to United States Steel Corp., states that the reducing reaction temperature range for the primary and the secondary reactors should be about 1100 to 1400° F. (593 to 760° C.), and that a reducing gas consisting mainly of hydrogen and about 25 volume percent of carbon monoxide is used to reduce $Fe_2O_3$ or $Fe_3O_4$ to FeO in the primary reactor, and subsequently FeO to metallic iron in the secondary reactor.

In contrast to the above process, in the present invention the temperature of the primary reactor will be maintained in the range between 450 and 600° C. and that of the secondary reactor between 700 and 900° C. In the primary reactor $Fe_2O_3$ or $Fe_3O_4$ is reduced to metallic iron, by-passing the state of an intermediate product FeO, and in the secondary reactor the remaining $Fe_2O_3$ or $Fe_3O_4$ is reduced to FeO and finally to metallic iron. This process is fundamentally different from Reed's process in respect to the mechanism of the reduction, though a two-step method is employed in both the processes.

It is an object of my invention to provide an improved direct reduction method by which an iron oxide is reduced rapidly and completely by a reducing gas consisting chiefly of hydrogen.

Another object of the invention is to provide an improved direct reduction method by which an inert iron powder is obtained easily from an iron oxide.

Another object is to provide an improved direct reduction method in which, because the most of the reduction of an iron oxide is carried out at a relatively low temperature, the reduction at a high temperature can be performed easily and simply because of the short reducing or residence time, so that the equipment may be constructed easily and inexpensively.

Still another object is to provide an improved direct reduction method in which a reducing gas consisting chiefly of hydrogen is most effectively used by heating the respective reaction zones at different temperatures and in which the reducing time is considerably shortened as compared with that of the conventional direct reduction processes, so that the production of the reduced metallic iron can be increased by a relatively small plant.

Briefly, the invention contemplates the rapid and complete reduction of iron oxide and simultaneously the production of a freshly reduced metallic iron in a stable state against reoxidation. By this method, finely comminuted iron oxide passes successively through at least two reaction zones, one of them being kept in a low temperature range between 450 and 600° C. and the other in a high temperature range between 700 and 900° C. Into said zones a suitable amount of reducing gas consisting chiefly of hydrogen, is supplied. Partly reduced iron product, having a sponge structure which is most favorable for further reduction, is produced in the low temperature reaction zone, and transferred into the high temperature reaction zone to complete reduction of partly reduced iron product to metallic iron prior to sintering of fine sponge structure. Then, the freshly reduced iron in a stable state against reoxidation is removed from the high temperature reactor before a noticeable agglomeration of fine iron oxide occurs. Accordingly, the invention is characterized in that an easy operation for a rapid reduction process of iron oxide by means of a reducing gas consisting chiefly of hydrogen is made possible by a series of steps mentioned above.

In order that my invention may be more readily visualized, reference may be made to the accompanying drawings, in which.

The process of this invention is fully described below. Generally, the reduction zone at a relatively elevated temperature has been heretofore used for the direct reduction of iron oxide by a reducing gas, and it is known that when the reducing reaction is performed at a high temperature a noticeable agglomeration of fine particles of iron oxide takes place in the course of reduction and makes the subsequent operation difficult. Accordingly, it is considered to be quite reasonable that the highest possible temperature at which a noticeable agglomeration does not take place is employed, since at elevated temperatures the reaction velocity constant and the driving force (described below) are large and therefore the utility of hydrogen becomes high. However, I have discovered in my experiments on the reduction of iron oxide that the reduction of iron oxide at such a relatively elevated temperature is not always advantageous. Because it has been found that at the initial stage of reduction in the elevated temperature zone a rapid reduction is well established, but subsequently at the intermediate or the final stage, the reduction velocity drops so sharply that a considerably long period of time is required to attain the reduction ratio of about 95% or more as clearly shown by a curve #1 of FIG. 4. Furthermore, if the reduction is carried out in the high temperature range for a long time, iron oxide particles tend to agglomerate, which makes subsequent operations difficult.

Figure 3:
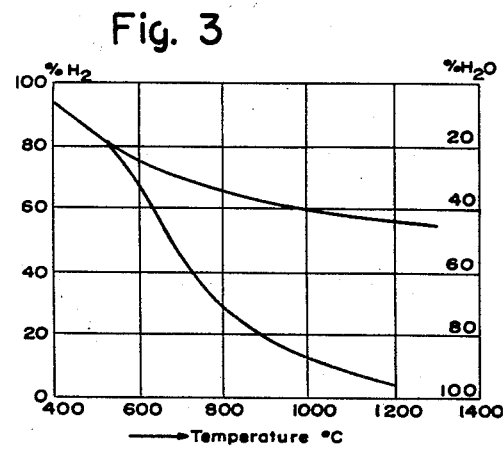
FIG. 3 shows a diagram representing a known equilibrium curve in the ordinary reducing reaction of an iron oxide by hydrogen.

Particularly, it is believed that in the high temperature zone the reduction at the initial stage proceeds fairly rapidly because of an increased reaction velocity constant and also an increased driving force for the reduction. (For instance, the driving force with a hydrogen-water system means the difference between the concentration of hydrogen in the reducing gas and its equilibrium concentration as shown in the equilibrium diagram FIG. 3.) However, when the iron oxide is retained in the elevated temperature reaction zone for a long period of time, at the intermediate or the final stage of the reduction, sintering takes place on the surface of reduced metallic iron. Finally the partly reduced oxide is covered entirely by a dense layer of reduced metallic iron which prevents considerably the permeation of the reducing gas into the internal unreduced part of the oxide or the removal of the water molecules formed by reduction. Accordingly, at the intermediate stage of the reduction the driving force for reduction decreases so sharply that the reducing velocity is rapidly lowered.

Figure 1:
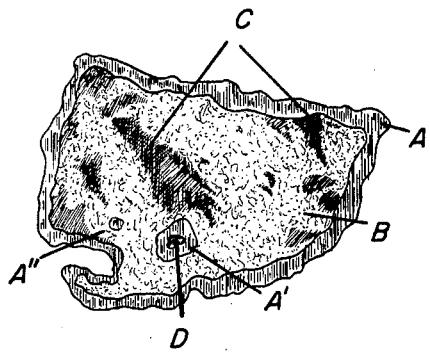
FIG. 1 shows a microphotograph of an iron oxide reduced at a high temperature in the present invention.

FIG. 1 shows a microphotograph showing an iron oxide particle reduced by hydrogen at 800° C. in the high temperature reactor, in which A indicates the dense layer of metallic iron formed by reduction, A' indicates a layer of iron formed around a pore, A" indicates the area where a pore disappeared by sintering of metallic iron produced around the pore by reduction because of very small size of these pores, B indicates unreduced wüstite FeO, C indicates a pore which is not connected to the surface, and D indicates a pore which is connected to the surface.

When the reduction is carried out at the high temperature mentioned above, wüstite FeO which is considered to be most difficult to be reduced is usually formed. The reductions are described as follows:

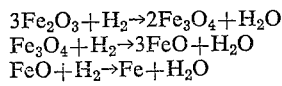

$$3Fe_2O_3 + H_2 \rightarrow 2Fe_3O_4 + H_2O$$
$$Fe_3O_4 + H_2 \rightarrow 3FeO + H_2O$$
$$FeO + H_2 \rightarrow Fe + H_2O$$

The above mentioned disadvantage, that a long period of time is required to attain the efficiency of reduction up to 95% or more at the high temperature range, has been removed by my discovery that a sponge structure is formed by the reduction in the low temperature range. By combining the low and high temperature reductions, the reduction ratio of 95% or more has been attained by the reduction of a very short period of time. As in the low temperature range, say, about 550° C., the reaction velocity constant and the driving force are small as compared with those of the high temperature range, the overall reducing velocity is relatively small. As clearly shown in FIG. 2, however, cracks or crevices develop in the ore particles with the reduction in the low temperature range resulting in producing active surface for a reduction.

The permeation of the reducing gas into an unreduced part of the oxide and the removal of water formed by a reduction are facilitated by the cracks and the crevices. In addition, sintering in the oxide particles hardly occurs in spite of their being retained for a long period of time in this low temperature range, and therefore the sponge structure is always kept. As a layer of wüstite FeO formed by the high temperature reduction does not exist in the temperature range below 570° C., a direct reduction of magnetite $Fe_3O_4$ to metallic iron is performed. This reduction is shown as follows:

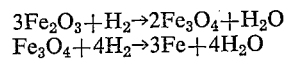

$$3Fe_2O_3 + H_2 \rightarrow 2Fe_3O_4 + H_2O$$
$$Fe_3O_4 + 4H_2 \rightarrow 3Fe + 4H_2O$$

Figure 2:
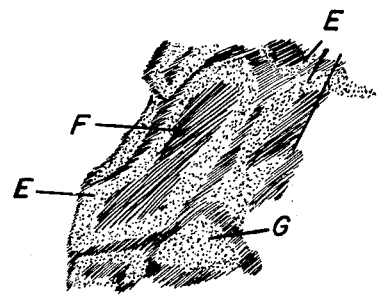
FIG. 2 shows a microphotograph of an iron oxide reduced at a low temperature in the present invention.

A microphotograph of an iron oxide reduced by hydrogen at 500° C. is shown in FIG. 2 in which E indicates a layer of metallic iron with a sponge structure, F magnetite, and G sponge iron completely reduced. Generally speaking, though a comparatively long period of time is required for the complete reduction of iron oxide in the low temperature range because of the decrease of the reaction velocity, it is considered that the oxide or partly reduced iron is always in an easily reducible state.

Based on the extensive research on the reduction of iron oxide in the above mentioned high and low temperature ranges, this invention contemplates the provision of novel combination of respective features of the reduction in the above temperature ranges by which a more rapid and effective reduction of iron oxide can be attained in contrast with the conventional direct reduction methods as presented previously. At the initial stage the reduction is slower at a low temperature than that at a high temperature, however, by the present invention consisting of the combined process of high and low temperature reactions, the reduction ratio of 99% or more, which has never been achieved by the conventional reduction processes carried out only at high temperatures, is attained easily and effectively. As described above, the reduction at its initial stage in the low temperature range is slower than that of the high temperature range. However, the reaction velocity may be increased somewhat by introducing a considerable amount of reducing gas so as to increase the driving force as much as possible. For example, it is possible to attain the reduction ratio of about 80% in five to twenty minutes in the low temperature reaction zone.

As the reduced iron thus obtained has the sponge structure mentioned above, it is possible to transfer them rapidly to the high temperature zone and then to subject them to the reduction within a short time without agglomeration. Thus the substantially complete reduction of iron oxide can be carried out within an extremely short time. In addition, the reduced iron product thus obtained is made stable against reoxidation by making the surface area of fine sponge structure small through sintering, and is removed from the high temperature reactor before agglomeration of sponge iron particles occurs.

Figure 4:
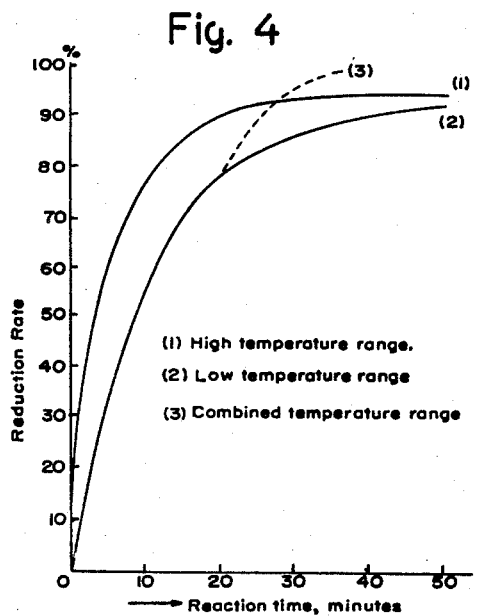
FIG. 4 shows a diagram showing the relation between the reduction time and the reduction ratio at a high or low temperature in this invention.

FIG. 4 shows the relation between the high and low temperature reductions in my invention. In this figure the reduction ratio is plotted against the time of the reduction.

The experiment was performed using 90 grams of Brazilian iron oxide of 100 to 150 mesh in size. This was treated with hydrogen introduced at the rate of 12 liters per minute. In the high temperature zone of 800° C., the reaction proceeds rapidly at the initial stage, but it suddenly becomes slow, at the final stage (see curve #1). In the low temperature zone of 500° C., the reducing velocity is slower than that in the high temperature zone (see curve #2). However, when the reduction ratio amounts to about 80% in the low temperature zone of 500° C., the reduced iron product is transferred to the high temperature zone of 800° C. to be reduced further (see dotted line #3). Thus the reduction proceeds rapidly and is almost completed within a very short period of time.

From the above, it seems evident that the reduction ratio of 99% or more can be easily achieved within a short period of time by this invention comprising the combination of the low and the high temperature reduction (curve #2 and #3 of FIG. 4).

The raw materials treated by this invention are iron ore of various origins, lateritic ore, flue dust, mill scale, etc. Hydrogen employed in this invention is not limited to the highly pure hydrogen and it may contain about 20% of other gases such as CO, $N_2$, $CH_4$, etc. However, $H_2O$ content of the reducing gas entering into the high and the low temperature reactor should be less than the equilibrium value at the operating temperature shown in FIG. 3.

Needless to say, if a preliminary reduction is carried out before the low temperature reduction, a more satisfactory and effective reduction will be expected. Generally, if the iron oxide to be treated is assumed to be hematite $Fe_2O_3$, the reduction of hematite to magnetite will proceed by hydrogen regardless of the water content in the reducing gas. The reducing reaction will take place as follows:

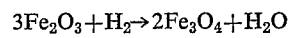

$$3Fe_2O_3 + H_2 \rightarrow 2Fe_3O_4 + H_2O$$

The effluent gas from the low temperature reactor has a large amount of sensible heat, and can preheat the newly fed iron oxide. Thus by using the effluent gas the oxide is reduced to a certain extent before it is charged into the low temperature reactor, resulting in an improved heat recovery for the circulating gas.

Figure 5:
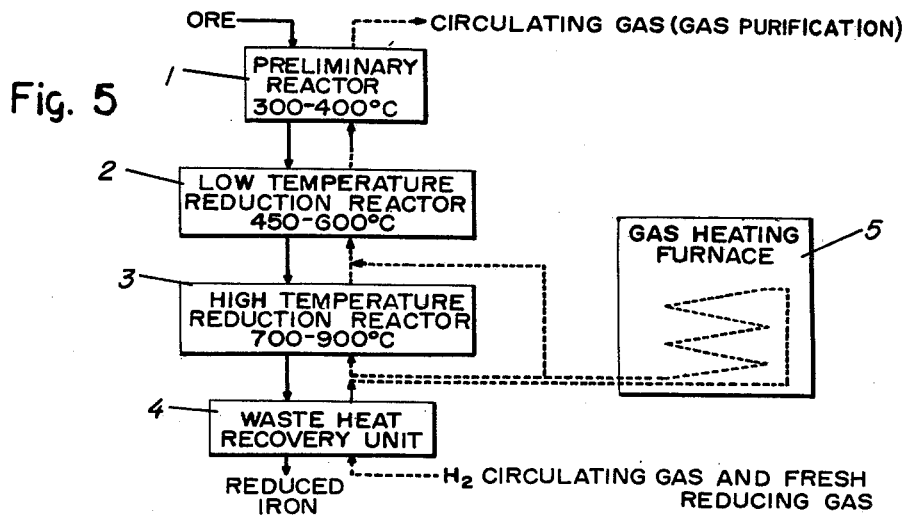
FIG. 5 shows a schematic block diagram illustrating a rapid direct reduction method mentioned in the present invention.

FIG. 5 represents a schematic block diagram of the direct reduction in this invention. An iron oxide is charged into a preliminary reactor 1 and reduced by about 10% at a temperature of 300 to 400° C. Then it is transferred to a low temperature reactor 2 and reduced by about 80% at a temperature of 450 to 600° C. Finally in a high temperature reactor 3, the remaining oxide of 20% is reduced completely at a temperature of 700 to 900° C. within a short period of time, resulting in the fine sponge iron powder which is inert against reoxidization through the sintering. As the reduced iron leaving the high temperature reactor possesses a considerable amount of sensible heat, it is introduced into a waste heat recovery unit 4 and then taken out of the system after cooling. On the other hand, the hydrogen gas leaving the waste heat recovery unit 4 is introduced into the high temperature reactor 3 through the gas heating furnace 5 and then transferred into the low temperature reactor 2. In some case a part of hydrogen gas leaving the gas heating furnace 5 may be introduced directly into the low temperature reactor 2.

Thus, the hydrogen gas passes through the low temperature reactor 2 and preliminary reactor 1. The effluent gas leaving preliminary reactor 1 passes through a purifying system in order to remove the water formed by the reduction, and returned to the reduction system as a recycle gas.

Figure 6:
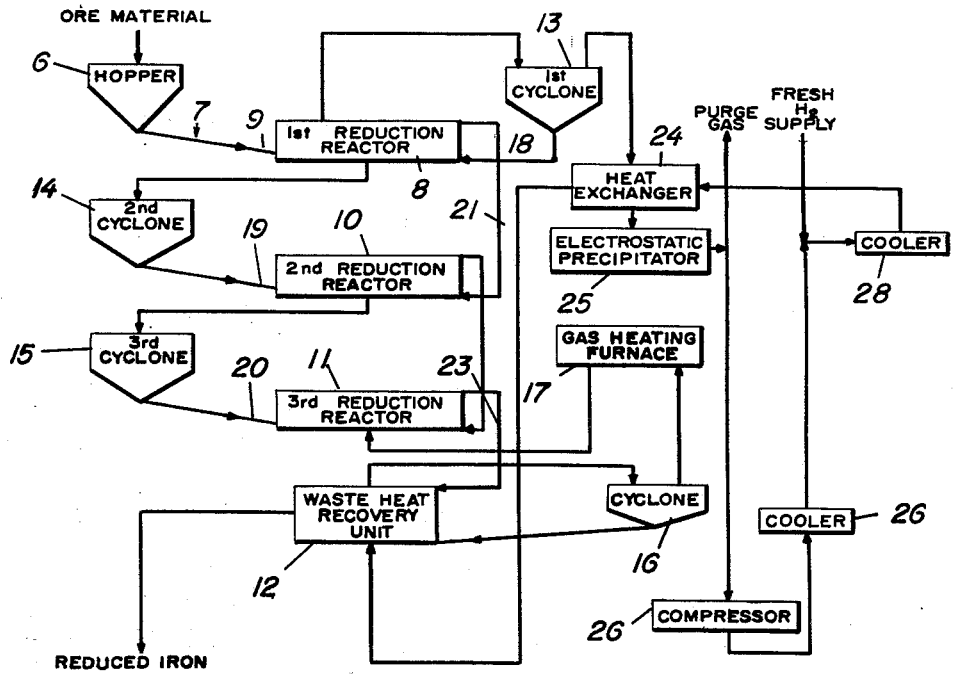
FIG. 6 shows a flow sheet for a preferred embodiment of the present invention.

A preferred embodiment of the invention is shown in FIG. 6. The iron ore comminuted to about 50 to 150 mesh powder, is put in the hopper 6, at the bottom of which a feeder 7 is attached. The feeding rate of the ore is controlled by this feeder which is connected with a conduit 9 leading to the bottom of the first reactor 8. The iron ore is continuously fed into the first reactor 8 through the conduit 9. The construction of the first reactor 8 is similar to that of the second reactor 10, the third reactor 11 or the waste heat recovery unit 12. At the bottom of each reactor a sieve plate is equipped through which a sufficient amount of reducing gas is introduced upwards so as to fluidize completely the powdered raw material. Thus the complete agitation of the gas and the powdered raw material is expected and the temperature of the reactant is also kept uniform. The effluent gas at a temperature of 450 to 600° C. from the top of the second reactor 10, is made free from flue dust by the second cyclone separator 14. The particles thus collected are returned to the second reactor 10 through the conduit 19, and the dust free gas is introduced to the first reactor 8 in which the newly fed ore is heated to 300 to 400° C. for the preliminary reduction at fluidized state. After heating and partly reducing the ore, the gas enters the purifying and circulating system through the first cyclone 13. The ore which is heated and partly reduced in the first reactor 8 enters the bottom of the second reactor 10 through an overflow pipe 21. The ore overflowing from the first reactor 8 is heated up to a temperature of 450 to 600° C. in the second reactor 10 by the gas at a temperature of 700 to 900° C. coming out of the third reactor 11. Here the reduction proceeds up to about 80%.

The gas passing through the second reactor 10 enters the first reactor 8 through the second cyclone 14 as above. The ore reduced by about 80% in the second reactor 10 enters the bottom of the third reactor 11 through the overflow pipe 22. The ore overflowing from the second reactor 10 is heated up to 700 to 900° C. in the third reactor 11 by the purified reducing gas heated at a temperature of 900 to 1100° C. by the gas heating furnace 17. The ore is thus reduced about 95% or more. The gas passing through the third reactor 11 enters the second reactor 10 through the third cyclone 15. The iron reduced 95% or more at a temperature of 700 to 900° C. in the third reactor 11 enters the bottom of the waste heat recovery unit 12 through the overflow pipe 23. Here the hot reduced iron powder is cooled at a fluidized state to 300 to 400° C. by the purified gas at a temperature of 100 to 150° C. in order to recover the heat of the hot reduced iron powder and also to prevent its reoxidation. After passing through the waste heat recovery unit 12, the gas is introduced to the gas heating furnace 17 through the cyclone 16, heated up to 900 to 1100° C. by the combustion of an adequate fuel, and then introduced to the third reactor 11 as a purified reducing gas. The gas entering the third reactor 11 flows counter to the ore descending through the first, second and third reactors. The effluent gas from the first reactor 8 is cooled to 150 to 200° C. by giving the heat to the circulating purified gas through the heat exchanger 24. The extremely fine ore contained in the effluent gas leaving the heat exchanger 24 is collected completely by the Cottrell electrostatic precipitator 25. Thus the dust free gas is introduced to the gas compressor 26. The gas compressed up to 2 to 3 atms., which is necessary for the compensation of pressure loss in the circulation system, is introduced into the cooler 27 in which the gas goes upwards against the cooling water coming from the top of the cooler 27. Here a part of the water formed by reduction and contained in the ore is removed. Thus partly dried gas is mixed with the fresh reducing gas supplied from outside, and the mixture contains less than 0.5% of moisture in volume after passing through the cooler 28 which contains Freon or ammonia as coolant. The purified reducing gas is passed through the heat exchanger 24 to recover the heat of the gas leaving the first reactor.

The foregoing example shows the essential feature of this invention carried out by the method based on the experimental results shown in FIG. 4. The degree of reduction in the low temperature reactor depends upon the kind, properties, and particle size of the iron oxide used and should be determined in accordance with the sintering rate of the fine sponge structure formed during the reduction process, reducing velocity, and agglomerating velocity in the high temperature reactor. Furthermore, as the flow sheet in this example shows only one of the numerous examples, it should be noted that the invention may be effected by the simultaneous provision of a shaft, horizontal, and retort furnace.

The examples of the invention are given as follows:

*Example 1*

| | |
|---|---|
| Reducing reactor | A fluidized-bed reactor has an inside diameter of 5 cm. Ore is supplied by batches. The reducing gas is supplied continuously. |
| Ore employed | Brazilian iron ore (Fe 68%). |
| Ore particle size | 100–150 mesh. |
| Flow rate of gas volume | 12 liters per minute. |
| Ore quantity | 90 grams. |

Under the above experimental conditions, the ore was subjected to the reduction at 500° C. for 20 min., resulting in the reduction ratio of 79%. Then it was subjected to further heating at 800° C. for 15 min. and reduced iron with the reduction ratio of 98.5% was obtained.

On the other hand, when the ore was reduced at 500 and 800° C. for 35 min. under the same conditions as listed above, the reduction ratio was 87% and 94% respectively. These values are smaller than that obtained by this invention.

*Example 2*

| | |
|---|---|
| Reducing reactor | Same as Example 1. |
| Ore employed | Same as Example 1. |
| Ore particle size | 48–60 mesh. |
| Flow rate of gas volume | Same as Example 1. |
| Ore quantity | 20 grams. |

Under the above experimental conditions, the ore was subjected to the reduction at 500° C. for 25 min., resulting in the reduction ratio of 74%. Then it was subjected to further heating at 800° C. for 5 min. and reduced iron with the reduction ratio of 96.8% was obtained.

On the other hand, when the ore was reduced at 500 and 800° C. for 30 min. under the same conditions as above, the reduction ratio was 87% and 93% respectively. These values are smaller than that obtained by this invention.

Example 3

| | |
|---|---|
| Reducing reactor | Same as Example 1. |
| Ore employed | Temangan iron ore (Fe 62%). |
| Ore particle size | 100–150 mesh. |
| Flow rate of gas volume | 9 liters per minute. |
| Ore quantity | 90 grams. |

Under the above experimental conditions, the ore was subjected to the reduction at 550° C. for 30 min., resulting in the reduction ratio of 78%. Then it was subjected to the further heating at 900° C. for 5 min. and reduced iron with the reduction ratio of 98% was obtained.

On the other hand, when the ore was reduced at 550 and 900° C. for 35 min. under the same conditions as above, the reduction ratio was 85% and 91% respectively. These values are smaller than that obtained by this invention.

Example 4

An iron ore containing 60% of Fe was comminuted to 50 to 100 mesh powder and delivered into an ore bin at the rate of 3.5 kilograms per hour, from which the ore was fed continuously into a preliminary reduction reactor. A reducing gas consisting of 96.5% of $H_2$, 2% of $N_2$ and $CH_4$, and 1.5% of $H_2O$ in volume was introduced into a reduction system at the flow rate of 1.4 cubic meters per hour. The ore was fed into the low temperature fluidized reactor whose inside diameter was 12 cm. and height was 100 cm., and then transferred to the high temperature fluidized reactor whose inside diameter was 12 cm. and height was 80 cm. Reduced iron with the reduction ratio of 95% was obtained at the rate of 2.5 kilograms per hour.

In contrast to the conventional direct reduction method of iron oxide, it has been clarified that in my invention the reduction is accelerated, the efficiency as well as the productivity is much improved, and the control of operation is facilitated due to a short time treatment in the high temperature reactor.

What I claim is:

In a fluidized method for the reduction of fine iron ore with a reducing gas consisting essentially of hydrogen which comprises continuously passing said iron ore successively downward through a preliminary reduction zone, a low temperature reduction zone, and a high temperature reduction zone at the same time passing heated reducing gas in countercurrent to said iron ore in said zones, the improvement consisting of heating said iron ore in said preliminary reduction zone to a temperature of 300°–400° C. and fluidizing the same by said reducing gas until said iron ore is reduced by about 10%; continuously passing the iron ore partially reduced in said preliminary reduction zone into the top of said low temperature zone, heating said partially reduced iron ore in said low temperature zone to a temperature of 450°–600° C. and fluidizing the same by said reducing gas until said iron ore is reduced by about 80%; continuously passing the iron ore partially reduced in said low temperature reaction zone into the top of said high temperature reduction zone, heating said partially reduced iron ore in said high temperature zone to a temperature of 700°–900° C. and fluidizing the same by said reducing gas until said iron ore is reduced by over 95%; and continuously passing the thus-reduced iron ore into a heat-waste recovery zone in counter-current to reducing gas recirculated from said preliminary reduction zone, whereby said reduced iron ore is cooled and said reducing gas is reheated.

References Cited in the file of this patent

UNITED STATES PATENTS

| 2,368,489 | Patterson | Jan. 30, 1945 |
| 2,444,916 | Cape et al. | July 13, 1948 |
| 2,767,076 | Taylor | Oct. 16, 1956 |
| 2,864,688 | Reed | Dec. 1, 1958 |

OTHER REFERENCES

A.I.M.E. Transactions, vol. 167, 1946, published by the Institute, 29 West 39th St., New York 18, N.Y., pages 237–280.